United States Patent [19]

Cairone, Sr.

[11] Patent Number: 4,501,564

[45] Date of Patent: Feb. 26, 1985

[54] LUMINESCENT FOAM FLOATS AND METHOD

[76] Inventor: David C. Cairone, Sr., 18 Buckingham Rd., Seymour, Conn. 06483

[21] Appl. No.: 362,915

[22] Filed: Mar. 29, 1982

[51] Int. Cl.³ .............................................. B63B 21/52
[52] U.S. Cl. ..................................... 441/20; 43/17.5; 43/43.1; 264/21
[58] Field of Search ..................... 441/1, 6, 11, 13, 20, 441/23, 85; 114/267, 221 R; 43/43.1, 16, 17, 17.5, 44.9; 264/21

[56] References Cited

U.S. PATENT DOCUMENTS

| 3,103,199 | 9/1963 | Gagnon | 114/221 R |
| 3,161,982 | 12/1964 | Lee | 43/43.1 |
| 3,392,475 | 7/1968 | Vakousky, Jr. | 43/44.9 |
| 3,445,551 | 5/1969 | Griffin | 264/21 |
| 4,194,936 | 3/1980 | Martuch | 43/17.5 |

FOREIGN PATENT DOCUMENTS 2946551  5/1981  Fed. Rep. of Germany ....... 43/43.1

Primary Examiner—Trygve M. Blix
Assistant Examiner—Jesûs D. Sotelo
Attorney, Agent, or Firm—Thomas L. Tully

[57] ABSTRACT

Luminescent or light-emitting floats, such as seine floats, molded from pore-forming resinous compositions which contain an effective amount of a luminescent or phosphorescent pigment. The present floats contain the light-emitting pigment not only at the outer surface thereof but also inwardly thereof so that the removal or wear of surface portions of the float uncover interior portions which also contain said pigment.

18 Claims, 6 Drawing Figures

LUMINESCENT FOAM FLOATS AND METHOD

BACKGROUND OF THE INVENTION

The present invention relates to the molding of novel marine floats, particularly seine or fishing net floats, which have the ability to emit light or glow in the dark.

Marine floats are commonly molded from pore-forming resinous compositions such as polyvinyl chloride compositions containing gas-forming or blowing agents. Reference is made, for example, to U.S. Pat. No. 3,392,475 for its disclosure of such floats and a method and composition for molding them. Such floats have excellent buoyancy due to their closed-cell, gas-containing structure.

Marine floats, such as seine floats and the fishing nets supported thereby, represent a hazard to boating at night because such floats are impossible to see in the darkness. Collision accidents can result in damage to the boat motor or propeller and to the floats and nets.

The use of brightly-colored paints, including fluorescent paints, on such floats does not solve the visibility problem in the darkness since such paints can only be seen if some amount of light is present to be reflected thereby. Also, such paints become eroded or worn from the relatively soft and pliable surface of microporous resinous or foam floats, during use, so that any advantage which justifies the expense of applying such paints is soon lost or severely diminished.

SUMMARY OF THE INVENTION

The present invention resides in the discovery that light-emitting foam floats can be molded from pore-forming resinous compositions which contain an effective amount of a luminescent or phosphorescent pigment, and that such light-emitting foam floats continue to retain their light-emitting properties even after prolonged periods of use during which the original exposed surface areas of the floats may be removed by erosion, scratching or frictional wear.

According to one embodiment of the present invention, the entire body of the foam float is molded from a homogeneous resinous composition containing the luminescent or phosphorescent pigment. More preferably, however, because of the high cost of the present pigments, they are incorporated into a portion of the pore-forming composition which will constitute the entire exposed outer layer of the foam float, or preselected areas of the exposed outer layer of the foam float, with the interior areas of the foam float being formed from the same pore-forming resinous composition except for the omission of the luminescent or phosphorescent pigment.

THE DRAWING

Figure 1:
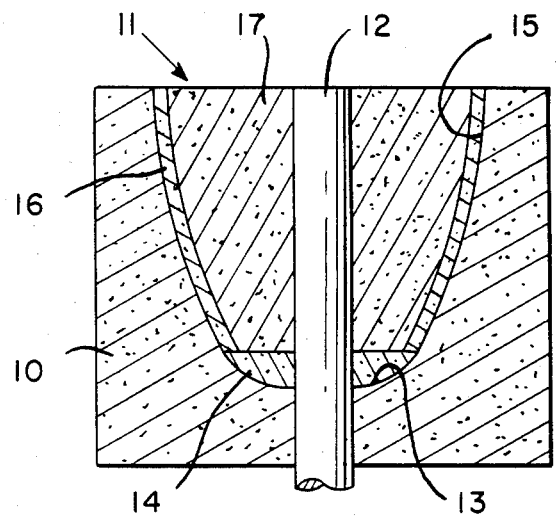
FIG. 1 is a cross-sectional view of a mold half-section, to a reduced scale, filled with resinous pore-forming composition according to one embodiment of the present invention.
Figure 4:
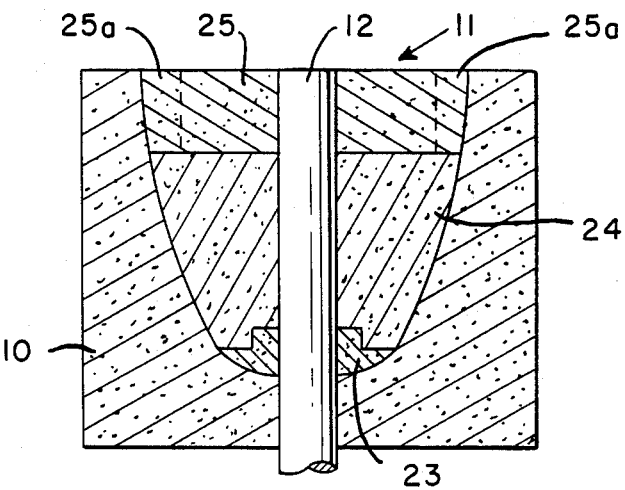
FIG. 4 is a cross-sectional view of a similar mold half-section filled with resinous pore-forming composition according to another embodiment of the present invention.

Referring to the drawing, the mold half-section 10 of FIGS. 1 and 4 comprises a mold cavity 11 having a central cylindrical mandrel 12, two such half-sections being aligned in filled condition, opening-to-opening, during the molding step to form a unitary molded foam float which, after removal from the mold sections can be heated to expand the float to a desired larger size.

FIG. 1 illustrates one embodiment of the invention in which three different resinous molding compositions are applied to different areas within the mold cavity for reasons which will be discussed more fully hereinafter. Initially, the base 13 of the mold cavity has applied thereto a small amount of a non-pore-forming resinous molding composition 14. Next, the curved wall 15 of the mold cavity is coated around the entire circumference thereof with a thick coating 16 of a pore-forming resinous composition containing an effective amount of a luminescent or phosphorescent pigment. Finally, the interior portion of the mold cavity is filled with a pore-forming resinous composition 17 identical to that of coating 16 but free of luminescent or phosphorescent pigment.

A second half-mold section is filled in identical manner, to provide two mold sections similar to that of FIG. 1. The two filled sections are clamped together, cavity-to-cavity to form the assembled closed mold which is heated to cause the various resinous molding compositions to set and integrate to form a unitary foam float which is removed from the mold and heat-expanded to form a larger float which has the appearance of the float 18 illustrated by FIG. 2.

Figure 2:
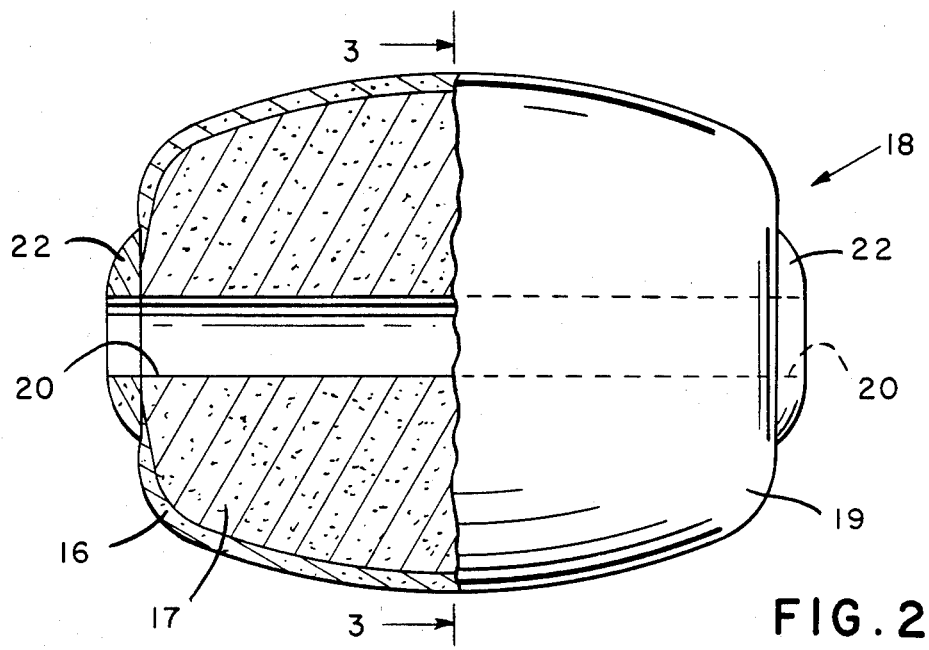
FIG. 2 is a plan view of a foam float, to a reduced scale, molded from a pair of mold sections according to FIG. 1.
Figure 3:
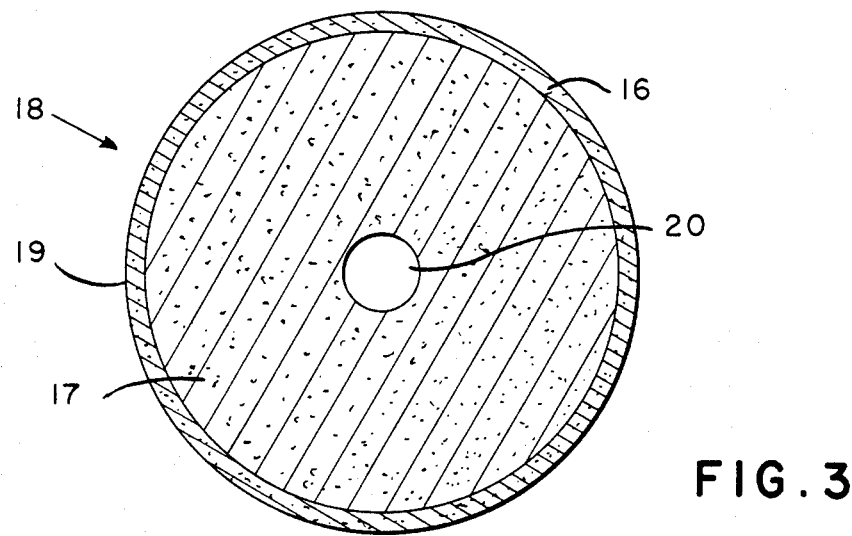
FIG. 3 is a cross-section taken along the line 3—3 of FIG. 2.

The float 18 of FIGS. 2 and 3 comprises a microporous resinous foam body which is round in cross-section, has an outer layer 19 comprising resin foam containing luminescent or phosphorescent pigment dispersed uniformly therethrough and an inner body 17 of identical foam except for the absence of the light-emitting pigment.

The float 18 also comprises a central transverse cylindrical passage 20, formed by the presence of the mandrels 12 of the mold, to permit a rope to be passed therethrough to fasten the float to a fish net, and non-porous, wear-resistant plastic reinforcing grommets 22 which are formed in-situ to strengthen the openings at each end of the passage 20 to prevent wear or cracking or splitting of the floats under the effects of rubbing against the support rope under the strain of the heavy net suspended therefrom.

Figure 5:
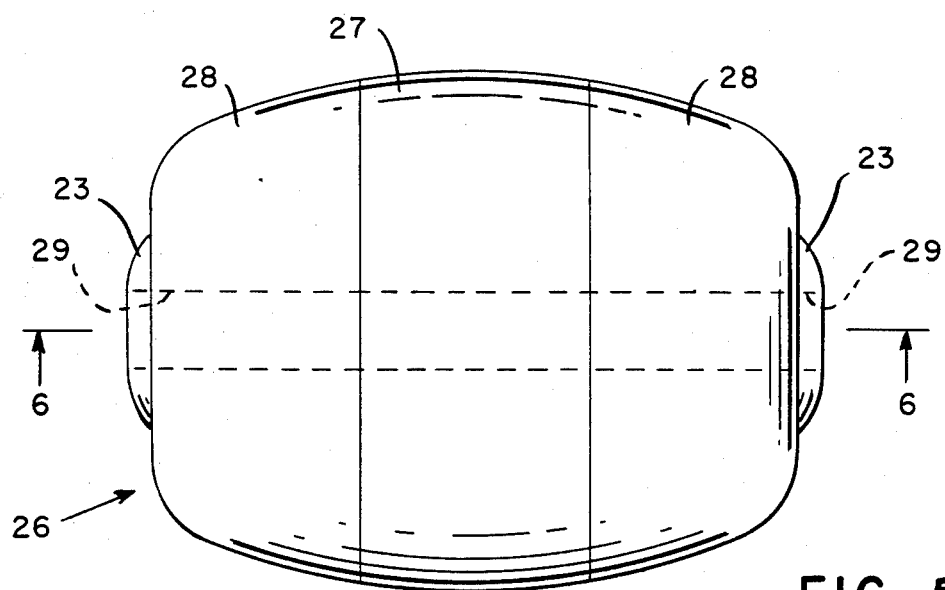
FIG. 5 is a plan view of a foam float, to a reduced scale, molded from a pair of mold sections according to FIG. 3.
Figure 6:
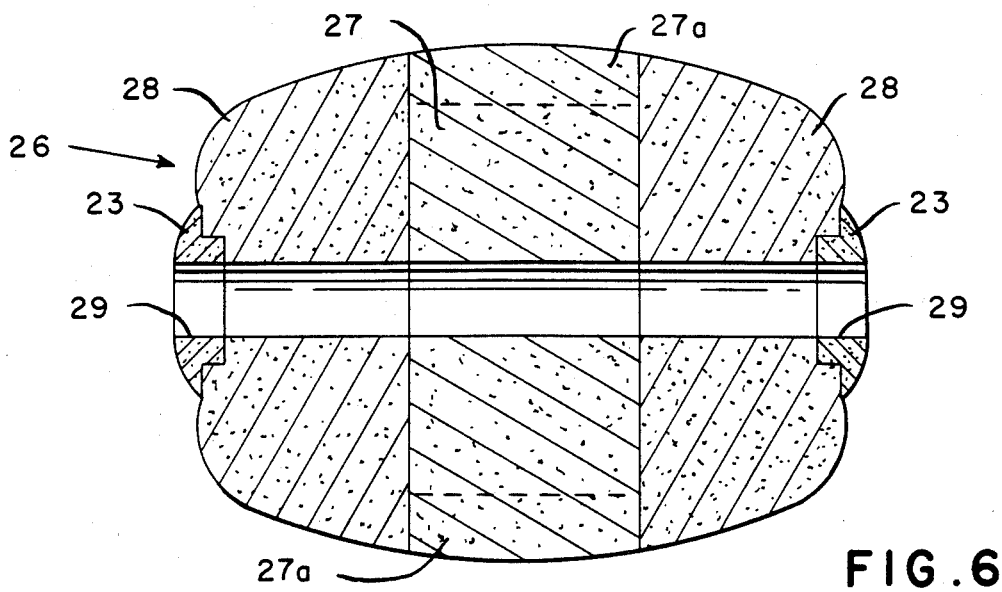
FIG. 6 is a cross-section taken along the line 6—6 of FIG. 5.

In the embodiment of FIGS. 4 to 6, an annular grommet 23 of polyvinyl chloride is pre-molded to have a shape and size to fit over the mandrel 12 and seat at the bottom of the cavity 11 of the mold 10, as illustrated. Next, the mold cavity 11 is filled to a desired level with a pore-forming polyvinyl chloride resinous composition 24 which contains a blowing agent but is free of luminescent pigment. Thereafter, the top area of the cavity 11 is filled with a pore-forming polyvinyl chloride resinous composition 25 which contains a blowing agent and a luminescent pigment.

A similar mold-half is filled in identical fashion and assembled opening-to-opening with the first mold half and clamped to form a closed mold which is heated to cure and integrate the resinous molding compositions. Thereafter, the mold halves are separated and the integral foam float is removed and heated to cause it to expand to a desired size. The float 26 produced, illustrated by FIGS. 5 and 6, has a round cross-section and comprises a central light-emitting belt area 27 consisting of the foamed resin composition containing the luminescent pigment, opposed end areas 28 consisting of foamed resin composition which does not contain such pigment, an axial cylindrical passage 29 adapted to receive a rope, and the end grommets 23 which have become fused or inegrated with the foam resin composition in areas 28 during the molding operation and which provide solid reinforcements at each end of the passage 29. Obviously, the solid plastic grommets have greater strength and resistance to erosion and cracking than does a foamed element of the same resinous composition.

If desired, the end grommets may be made larger in volume and size so as to provide flanges which approximate the maximum diameter of the float, and may contain the luminescent or phosphorescent pigment to form light-emitting end areas of the float.

The molding compositions useful according to the present invention are conventional compositions except for the incorporation of the luminescent or phosphorescent pigment into the portion of the molding composition which is to form the light-emitting areas of the float. Thus, the present molding compositions comprise an expandable thermoplastic resinous binder material such as a vinyl resin, most preferably polyvinyl chloride, a vinyl aromatic resin such as polystyrene, a polyurethane resin or other conventional foam-forming resin. Conventional gas-evolving or blowing agents, plasticizers, solvents, stabilizers and other ingredients may be added as disclosed, for example, in aforementioned U.S. Pat. No. 3,392,475. The molding compositions are formulated to provide semi-solid, putty-like soft compositions which can be pressed into the mold and will retain their pressed shape, i.e., they are self-supporting. Thus, the surface layer 16 of FIG. 1 can be packed in place and will not move or flow down into the bottom of the mold half 10. Similarly, the filled half-molds of FIGS. 1 and 2 can be inverted without any movement of the foam-forming compositions therefrom.

The following examples illustrate suitable compositions for forming (1) the light-emitting foam-forming resinous composition used to produce the coating 16 of FIG. 1 and the central area 25 of FIG. 4; (2) the foam-forming resinous composition used to produce the filled area 17 of FIG. 1 and the end area 24 of FIG. 4; and (3) the reinforcing composition used to form the grommets 14 of FIG. 1 and to pre-form the grommets 23 of FIG. 4.

EXAMPLE 1

The following ingredients are mixed uniformly to produce a foam-forming, luminescent molding paste composition suitable for application to the mold as surface layer 16 of FIG. 1 or central layer 25 of FIG. 4:

| Ingredients | Parts By Weight |
| --- | --- |
| Polyvinyl chloride resin | 60.0 |
| Dioctyl phthalate | 17.7 |
| Azocarbonimide | 5.9 |
| Luminescent pigment | 17.7 |
| Ethyl acetate | 17.7 |

EXAMPLE 2

A foam-forming non-luminescent molding paste composition suitable for application to the mold as filled area 17 of FIG. 1 and end area 24 of FIG. 4, for subsequent molding, may be produced by uniformly mixing the same ingredients in the same proportions set forth in Example 1 except that the luminescent pigment is omitted.

EXAMPLE 3

The grommets 14 of FIG. 1 or 23 of FIG. 4 may be pre-molded or may be formed in the mold from a non-pore-forming resinous molding composition such as one comprising 70 parts by weight of polyvinyl chloride resin and 30 parts by weight of dioctyl phthalate plasticizer. If desired, the grommets may be made luminescent by the addition of from about 5% up to about 50% by weight of a luminescent pigment.

The present floats are formed by inserting the aforementioned molding compositions in the desired areas of the mold and around the central mandrel, closing the mold and heating to a temperature of about 325° F. under sufficient pressure and for a sufficient time to cure the molding compositions and cause them to fuse and integrate into a unitary molded pre-float. Next, the pre-float is removed from the mold and is heated under controlled conditions and atmospheric pressure to cause the activation of the blowing agent and the expansion of the pre-float uniformly in all directions to any desired size and density. Generally, the expansion ranges between about 2 to 4 times the mold size. Therefore, different mold sizes are used to produce expanded floats of different sizes.

The preferred luminescent pigments include Green Yellow Grade 6SSU, a zinc sulfide-copper pigment commercially-available from United Minerals And Chemicals Corp. This pigment has a particle size of 20±5 microns, a coating saturation thickness of 0.3 mm, and an afterglow in total darkness of 18 hours.

Other suitable luminescent pigments include the Glow Phosphorescent Pigments which are commercially-available from Shannon Luminous Materials Co. Such pigments have a particle size of about 150 mesh and include B-320 (Invisible Blue), B-324 (Invisible Turquoise), B-330 (Invisible Green), B-340 (Invisible Yellow) and B-381 (White).

The effective weight percentage, based upon the total weight of the float, varies somewhat depending upon the density of the final float since the gas-filled pores of the float tend to mask the luminescence. In the grommet areas, where no pososity is present, the luminescent pigments are effective in amounts as low as 5% and as high as 50% or more, based upon the total weight of the grommet-forming composition.

In the foam-forming composition used to produce the bulk of the float, the luminous pigment has been found effective in a weight range of from about 10% up to about 70% or more, based upon the total weight of the pore-forming compositions which includes said pigment. Foam densities of 0.0046 specific gravity (3 lbs./cu. ft.) to 0.125 specific gravity (8 lbs./cu. ft.) are preferred for good buoyancy and economy but require larger amounts of the luminous pigments, i.e., from about 25% up to 70% or more depending upon the number of light-emission hours desired. A foam float containing 25% by weight of luminescent pigment will glow for about 6 hours in darkness, while a foam float containing 50% by weight of said pigment will glow for about 11 hours in darkness and one containing 70% by weight of said pigment will glow for about 16 hours in darkness. Generally, a glow period of about 11 hours is adequate for uses in most areas.

Since the luminescent pigments are expensive, it is desirable to use them in the smallest possible effective amounts. Thus, the embodiment of FIGS. 1 to 3 is preferred, since the luminescent pigment is confined to a relatively thin surface area 16 of the float. It is also preferred to reduce the amount of blowing agent present in the composition used to form surface area 16, to to exclude blowing agent completely from such composition whereby smaller amounts of luminescent pigment may be used therein, or longer light-emission periods may be obtained due to the reduction or exclusion of the pores which tend to mask the emission.

Similarly, the floats of FIGS. 4 to 6 may be formed by limiting the luminescent pigment composition 25 to a narrow surface thickness 25a and 27a as shown by means of broken lines in FIGS. 4 and 6, thereby avoiding waste of the luminescent pigment in the interior areas of the float.

The present invention is concerned mainly with the production of seine floats which are luminescent or phosphorescent, i.e., have the ability to absorb light during the daylight hours and to glow or emit light during the hours of darkness, so as to provide buoyant support elements, for fishing nets, which are visible in the water at night. However, the need for and the advantages of the present invention apply also to other marine floats such as those used to mark the location of lobster traps, boat moorings, channel markers, divers, submerged obstacles and for other similar purposes. Such floats are also subject to surface erosion or other surface damage during use, whereby the application of an exterior luminescent paint is unsatisfactory to produce the desired results over an extended period of time. The novel floats of the present invention contain the luminescent pigment uniformly dispersed throughout at least a substantial thickness of the porous foam body, adjacent the exposed surface so that the wearing away, erosion, chipping or scratching of some of the foam composition from the exposed surface will merely expose underlying resinous foam containing additional luminescent pigment, so that the light-emitting properties of the float are not reduced.

Variations and modifications of the present invention will be apparent to those skilled in the art within the scope of the present claims.

I claim:

1. Luminescent marine seine float comprising a heat expanded microporous molded body of foamed synthetic thermoplastic resinous composition having an exposed outer surface portion which is susceptible to erosion, wearing away, chipping and scratching of some of the foam composition therefrom and having an integral transverse axial passage capable of receiving a rope therethrough characterized by the exposed outer surface area of said float comprising at least one surface portion of said foamed synthetic thermoplastic resinous composition containing an effective amount of a luminescent pigment uniformly dispersed throughout at least a substantial thickness thereof to cause said surface portion to emit light during several hours of darkness, the erosion, wearing away, chipping or scratching of the exposed areas of the surface portion merely exposing underlying areas of the surface portion which also contain said luminescent pigment so that the light-emitting properties of said surface portion are not reduced, at least one adjacent surface portion of said float comprising a surface portion which does not contain luminescent pigment.

2. Float according to claim 1 in which the interior portions of said molded body comprise a foamed resinous composition which does not contain a luminescent pigment.

3. Float according to claim 1 having a foam density between about 0.0046 and 0.125 and a weight between about 3 and 8 pounds per cubic foot.

4. Float according to claim 1 in which the same synthetic thermoplastic resin is present in the compositions which contain and do not contain luminescent pigment.

5. Float according to claim 1 in which the luminescent pigment is present in said surface portion in an amount of between about 10% and 70% by weight based upon the total weight of the resinous composition containing said pigment.

6. Float according to claim 1 in which said microporous body comprises grommets molded of non-porous synthetic thermoplastic resinous composition integral with said float at each end of said passage to provide reinforcing liners surrounding the openings of said passage.

7. Float according to claim 6 in which said grommets contain said luminescent pigment.

8. Method for molding a luminescent foamed resinous seine float having an exposed outer surface portion which is susceptible to erosion, wearing away, chipping and scratching of some of the luminescent foam composition therefrom without reduction of the light-emitting properties of said surface portion, comprising the steps of:

(a) uniformly mixing at least a portion of a foam-forming synthetic thermoplastic resinous composition with a sufficient amount of a luminescent pigment to form a light-emitting composition having the ability to emit light during several hours of darkness;
  (b) injecting said composition into a mold cavity at least adjacent to some of the portions of the wall of the mold having said mold cavity, the remainder of said cavity, if any, being injected with foam-forming synthetic thermoplastic resinous composition which does not contain said luminescent pigment;
  (c) heating said mold to cure said resinous composition and form a molded body in which at least a substantial thickness of at least some of the exposed outer surface portion contains said luminescent pigment uniformly dispersed throughout, and
  (c) removing said molded body from the mold and heating it to expand said foam-forming resinous composition and form a microporous float having luminescent exposed surface portions having light-emitting properties which are not reduced by the erosion, wearing away, chipping or scratching of some of the foam composition therefrom.

9. Method according to claim 8 in which said luminescent pigment is present in a weight of from about 10% to about 70% based upon the total weight of the resinous composition containing said pigment.

10. Method according to claim 8 which comprises preparing a second synthetic thermoplastic foam-forming resinous molding composition which does not contain luminescent pigment, injecting the light-emitting composition adjacent at least some portions of the wall of the mold forming the mold cavity and injecting the second composition to substantially fill the remaining portions of said mold cavity.

11. Method according to claim 10 which comprises injecting said light-emitting composition to substantially completely cover the entire wall of the mold forming the mold cavity, and injecting the second composition to substantially completely fill the interior portions of said mold cavity.

12. Method according to claim 10 which comprises injecting said light-emitting and second compositions to substantially fill the mold cavity and cover adjacent areas of the wall of the mold with said compositions.

13. Method according to claim 8 in which said mold comprises a central axial mandrel adapted to form a central axial passage in said molded body, applying non-foam-forming synthetic thermoplastic resinous composition to the portions of said mold cavity adjacent the ends of said mandrel to surround said ends, prior to the injection of said light-emitting composition, whereby the formed microporous body comprises a central axial passage, the ends of which are surrounded by reinforced areas of said body comprising fused non-porous resinous composition.

14. Method according to claim 13 which comprises premolding said non-foam-forming resinous composition to form non-porous reinforcing ring elements having a central opening slightly larger than the diameter of said mandrel, and applying said ring elements over said mandrel to occupy the portions of the mold cavity adjacent each end of the mandrel.

15. Method according to claim 13 in which said non-foam-forming composition contains luminescent pigment.

16. Method according to claim 8 in which the mold is heated to a temperature of about 325° to cure said resinous composition.

17. Method according to claim 8 in which said molded body is heated sufficiently to expand it to from about 2 to 4 times the mold size.

18. Method according to claim 17 in which the expanded float has a foam density of between about 0.0046 and 0.125 and a weight between about 3 and 8 pounds per cubic foot.

* * * * *